United States Patent
Tarkin-Tas et al.

(10) Patent No.: US 10,647,877 B2
(45) Date of Patent: May 12, 2020

(54) PARTICULATE POLY(PHENYLENE ETHER)-CONTAINING VARNISH COMPOSITION, COMPOSITE AND LAMINATE PREPARED THEREFROM, AND METHOD OF FORMING COMPOSITE

(71) Applicant: SABIC GLOBAL TECHNOLOGIES B.V., Bergen op Zoom (NL)

(72) Inventors: Eylem Tarkin-Tas, Delmar, NY (US); Edward Norman Peters, Lenox, MA (US)

(73) Assignee: SABIC GLOBAL TECHNOLOGIES B.V., Bergen Op Zoom (NL)

(*) Notice: Subject to any disclaimer, the term of this patent is extended or adjusted under 35 U.S.C. 154(b) by 243 days.

(21) Appl. No.: 15/519,300

(22) PCT Filed: Sep. 24, 2015

(86) PCT No.: PCT/US2015/051831
§ 371 (c)(1),
(2) Date: Apr. 14, 2017

(87) PCT Pub. No.: WO2016/081063
PCT Pub. Date: May 26, 2016

(65) Prior Publication Data
US 2017/0247566 A1     Aug. 31, 2017

Related U.S. Application Data

(60) Provisional application No. 62/081,610, filed on Nov. 19, 2014.

(51) Int. Cl.
| | |
|---|---|
| *C08J 5/24* | (2006.01) |
| *B32B 27/04* | (2006.01) |
| *B32B 27/18* | (2006.01) |
| *B32B 27/38* | (2006.01) |
| *C08L 63/00* | (2006.01) |
| *C08L 71/12* | (2006.01) |
| *C09D 171/12* | (2006.01) |
| *B32B 5/02* | (2006.01) |
| *B32B 5/26* | (2006.01) |
| *B32B 5/08* | (2006.01) |
| *B32B 5/22* | (2006.01) |
| *C09D 7/20* | (2018.01) |
| *C08J 5/04* | (2006.01) |
| *C09D 163/00* | (2006.01) |
| *C09D 163/04* | (2006.01) |
| *C09D 179/04* | (2006.01) |

(52) U.S. Cl.
CPC ............ *C09D 171/12* (2013.01); *B32B 5/02* (2013.01); *B32B 5/022* (2013.01); *B32B 5/08* (2013.01); *B32B 5/22* (2013.01); *B32B 5/26* (2013.01); *C08J 5/043* (2013.01); *C08J 5/24* (2013.01); *C08L 71/12* (2013.01); *C09D 7/20* (2018.01); *C09D 163/00* (2013.01); *C09D 163/04* (2013.01); *C09D 179/04* (2013.01); *B32B 2250/20* (2013.01); *B32B 2260/021* (2013.01); *B32B 2260/023* (2013.01); *B32B 2260/046* (2013.01); *B32B 2262/0269* (2013.01); *B32B 2262/101* (2013.01); *B32B 2262/106* (2013.01); *B32B 2262/14* (2013.01); *B32B 2264/02* (2013.01); *B32B 2264/0214* (2013.01); *B32B 2307/204* (2013.01); *B32B 2457/08* (2013.01); *C08J 2363/02* (2013.01); *C08J 2363/04* (2013.01); *C08J 2371/12* (2013.01); *C08J 2379/04* (2013.01); *C08J 2471/12* (2013.01)

(58) Field of Classification Search
CPC .. C08L 63/00; C08L 71/12; C08J 5/24; B32B 27/04; B32B 27/18; B32B 27/38
USPC ............... 523/400, 427, 454; 525/523, 534; 428/297.4, 413
See application file for complete search history.

(56) References Cited

U.S. PATENT DOCUMENTS

| | | | |
|---|---|---|---|
| 5,087,657 A | | 2/1992 | Qureshi et al. |
| 5,834,565 A | | 11/1998 | Tracy et al. |
| 6,352,782 B2 | | 3/2002 | Yeager et al. |
| 7,090,920 B2 | | 8/2006 | Davis et al. |
| 7,655,278 B2 | | 2/2010 | Braidwood et al. |
| 8,017,697 B2 | | 9/2011 | Carrillo et al. |
| 2006/0135706 A1* | | 6/2006 | Davis ..................... C08L 63/00 525/396 |
| 2007/0093614 A1 | | 4/2007 | Uchida et al. |

(Continued)

FOREIGN PATENT DOCUMENTS

| | | |
|---|---|---|
| JP | 2004059596 A | 2/2004 |
| JP | 2008050526 A | 3/2008 |
| WO | 2008094796 A1 | 8/2008 |

OTHER PUBLICATIONS

International Preliminary Report on Patentability (IPRP) for PCT/US2015/051831 dated Mar. 8, 2017, 7 pages.

(Continued)

*Primary Examiner* — Michael J Feely
(74) *Attorney, Agent, or Firm* — Cantor Colburn LLP

(57) ABSTRACT

A curable composition includes specific amounts of a ketone, a curable component, and particulate poly(phenylene ether) having a mean particle size of 3 to 12 micrometers and a particle size relative standard deviation of 20 to 60 percent. The composition has a low viscosity that facilitates wetting of reinforcing structures, and composites formed from the composition and a reinforcing structure cure to form a dielectric material with a low dielectric constant and loss tangent.

15 Claims, No Drawings

(56) References Cited

U.S. PATENT DOCUMENTS

2008/0178983 A1* 7/2008 Braidwood ............ C08L 71/12
156/48
2012/0329961 A1 12/2012 Carrillo et al.
2014/0005340 A1 1/2014 Peters et al.
2014/0127462 A1 5/2014 Endo et al.

OTHER PUBLICATIONS

International Search Report; International Application No. PCT/US2015/051831; International Filing Date: Sep. 24, 2015; dated Jan. 6, 2016; 3 pages.

Written Opinion. International Application No. PCT/US2015/051831; International Filing Date: Sep. 24, 2015; dated Jan. 6, 2016; 6 pages.

Database WPI, "Resin composition for prepreg used for laminated sheet, comprises polyphenylene-ether resin particles having preset average particle diameter and number average molecular weight, epoxy resin, hardener and inorganic filler," Clarivate Analytics, 2008; 3 pages.

Database WPI, "Resin composition for printed wiring board, has polyphenylene oxide having preset mass mean molecular weight and specifc structural units, and epoxy resin having epoxy group, as essential components," Clarivate Analytics, 2004; 6 pages.

\* cited by examiner

PARTICULATE POLY(PHENYLENE ETHER)-CONTAINING VARNISH COMPOSITION, COMPOSITE AND LAMINATE PREPARED THEREFROM, AND METHOD OF FORMING COMPOSITE

This application is a national stage application of PCT/US2015/051831 filed Sep. 24, 2015, which claims priority to U.S. Provisional Application No. 62/081,610 filed Nov. 19, 2014, both of which are hereby incorporated by reference in their entirety.

BACKGROUND OF THE INVENTION

Another approach to decreasing dielectric constants and loss tangents has been to incorporate poly(phenylene ether) particles into curable materials. See, e.g., U.S. Pat. No. 5,087,657 to Qureshi et al., and U.S. Pat. No. 7,655,278 to Endo et al.; and U.S. Patent Application Publication No. US 2014/0005340 A1 of Peters et al. However, the methods of these references have the disadvantage of using relatively high-viscosity uncured materials. And the Qureshi and Endo methods have the further disadvantage of using a relatively broad distribution of poly(phenylene ether) particle sizes, which has been found to reduce the strength of the resulting composites. There remains a need for dielectric materials exhibiting low viscosity in the uncured state, and low dielectric constants and loss tangents in the cured state.

BRIEF SUMMARY OF EMBODIMENTS OF THE INVENTION

One embodiment is a composition comprising, based on the total weight of the composition: 30 to 70 weight percent of a ketone selected from the group consisting of acetone, methyl ethyl ketone, methyl isobutyl ketone, and combinations thereof; 15 to 60 weight percent of a curable component; and 5 to 40 weight percent of particulate poly(phenylene ether) having a mean particle size of 3 to 12 micrometers and a particle size relative standard deviation of 20 to 60 percent.

Another embodiment is a method of forming a composite, comprising: at least partially coating a reinforcing structure with a curable composition, wherein the curable composition comprises, based on the total weight of the composition, 30 to 70 weight percent of a ketone selected from the group consisting of acetone, methyl ethyl ketone, and combinations thereof; 15 to 60 weight percent of a curable component; 5 to 40 weight percent of particulate poly(phenylene ether) having a mean particle size of 3 to 12 micrometers and a particle size relative standard deviation of 20 to 60 percent; and an effective amount of a curing agent for the curable component to form a curable composition-coated reinforcing structure; and removing at least a portion of the ketone from the curable composition-coated reinforcing structure to form the composite.

Another embodiment is a composite comprising: a reinforcing structure; and an at least partially cured resin at least partially coating the reinforcing structure; wherein the at least partially cured resin comprises, based on the total weight of the at least partially cured resin, 10 to 60 weight percent of a particulate poly(phenylene ether) having a mean particle size of 3 to 12 micrometers and a particle size relative standard deviation of 20 to 60 percent, and 40 to 90 weight percent of a product of at least partially curing a curable component selected from the group consisting of cyanate ester resins, triallyl cyanurate, triallyl isocyanurate, polybutadienes, difunctional epoxy compounds, polyfunctional epoxy compounds, unsaturated esterimide resins, curable silicone resins, and combinations thereof, and an effective amount of a curing agent for the curable component.

Another embodiment is a laminate comprising the product of laminating a plurality of prepregs, wherein each prepreg comprises a reinforcing structure; and an at least partially cured resin at least partially coating the reinforcing structure; wherein the at least partially cured resin comprises, based on the total weight of the at least partially cured resin, 10 to 60 weight percent of a particulate poly(phenylene ether) having a mean particle size of 3 to 12 micrometers and a particle size relative standard deviation of 20 to 60 percent, and 40 to 90 weight percent of a product of at least partially curing a curable component selected from the group consisting of cyanate ester resins, triallyl cyanurate, triallyl isocyanurate, polybutadienes, difunctional epoxy compounds, polyfunctional epoxy compounds, unsaturated esterimide resins, curable silicone resins, and combinations thereof, and an effective amount of a curing agent for the curable component.

These and other embodiments are described in detail below.

DETAILED DESCRIPTION OF THE INVENTION

The present inventors have determined that dielectric materials with low dielectric constants and loss tangents in the cured state can be obtained from an uncured composition comprising particulate poly(phenylene ether) and having a low viscosity that facilitates wetting of reinforcing structures.

Thus, one embodiment is a composition comprising, based on the total weight of the composition: 30 to 70 weight percent of a ketone selected from the group consisting of acetone, methyl ethyl ketone, methyl isobutyl ketone, and combinations thereof; 15 to 60 weight percent of a curable component; and 5 to 40 weight percent of particulate poly (phenylene ether) having a mean particle size of 3 to 12 micrometers and a particle size relative standard deviation of 20 to 60 percent.

The composition comprises a ketone selected from the group consisting of acetone, methyl ethyl ketone, methyl isobutyl ketone, and combinations thereof. These ketones are relatively volatile, which facilitates solvent removal from composites at least partially coated with the composition. These ketones are also poor solvents for poly(phenylene ether). So, the particulate poly(phenylene ether) does not dissolve in the composition. In some embodiments, the ketone comprises acetone. In some embodiments, the ketone comprises methyl ethyl ketone. In some embodiments, the ketone comprises methyl isobutyl ketone.

The composition comprises the ketone in an amount of 30 to 70 weight percent, based on the total weight of the composition. Within this range, the ketone amount can be 40 to 60 weight percent, specifically 45 to 55 weight percent.

In addition to the ketone, the composition comprises a curable component. The curable component is preferably at least partially soluble in the ketone at a temperature below the atmospheric boiling point of the ketone. Suitable examples of the curable component include cyanate ester resins, triallyl cyanurate, triallyl isocyanurate, polybutadienes, difunctional epoxy compounds, polyfunctional epoxy compounds, unsaturated esterimide resins, curable silicone resins, and combinations thereof. As used herein, the term difunctional epoxy compound refers to a compound having two epoxy groups per molecule. The term polyfunctional epoxy compound refers to a compound having more than two epoxy groups per molecule. In some embodiments, the curable component is selected from the group consisting of cyanate ester resins, triallyl isocyanurate, polybutadienes, difunctional epoxy compounds, cresol novolac epoxies, and combinations thereof. In some embodiments, the curable component is a bisphenol A epoxy resin, which is a reaction product of bisphenol A and epichlorohydrin.

The composition includes the curable component in an amount of 15 to 60 weight percent, based on the total weight of the composition. Within this range, the amount of the curable component can be 20 to 55 weight percent, specifically 25 to 50 weight percent.

In addition to the ketone and the curable component, the composition comprises a particulate poly(phenylene ether). The particulate poly(phenylene ether) has a mean particle size of 3 to 13 micrometers, and a particle size relative standard deviation of 20 to 60 percent. The particle size relative standard deviation is calculated as [100×(particle size standard deviation)]/(mean particle size). Within the range of 3 to 13 micrometers, the particulate poly(phenylene ether) can have a mean particle size of 4 to 10 micrometers, specifically 5 to 8 micrometers. Within the range of 20 to 60 percent, the particulate poly(phenylene ether) particle size relative standard deviation can be 30 to 50 percent, specifically 30 to 45 percent.

Poly(phenylene ether)s include those comprising repeating structural units having the formula

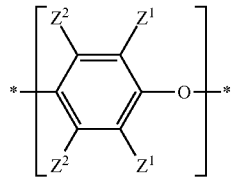

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

The poly(phenylene ether) can comprise molecules having aminoalkyl-containing end group(s), typically located in a position ortho to the hydroxyl group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a random copolymer, a graft copolymer, an ionomer, or a block copolymer.

In some embodiments, the poly(phenylene ether) comprises a poly(phenylene ether)-polysiloxane block copolymer. As used herein, the term "poly(phenylene ether)-polysiloxane block copolymer" refers to a block copolymer comprising at least one poly(phenylene ether) block and at least one polysiloxane block.

In some embodiments, the poly(phenylene ether)-polysiloxane block copolymer is prepared by an oxidative copolymerization method. In this method, the poly(phenylene ether)-polysiloxane block copolymer is the product of a process comprising oxidatively copolymerizing a monomer mixture comprising a monohydric phenol and a hydroxyaryl-terminated polysiloxane. In some embodiments, the monomer mixture comprises 70 to 99 parts by weight of the monohydric phenol and 1 to 30 parts by weight of the hydroxyaryl-terminated polysiloxane, based on the total weight of the monohydric phenol and the hydroxyaryl-terminated polysiloxane. The hydroxyaryl-diterminated polysiloxane can comprise a plurality of repeating units having the structure

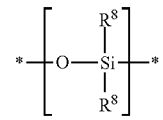

wherein each occurrence of $R^8$ is independently hydrogen, $C_1$-$C_{12}$ hydrocarbyl or $C_1$-$C_{12}$ halohydrocarbyl; and two terminal units having the structure

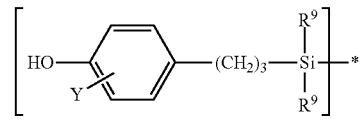

wherein Y is hydrogen, $C_1$-$C_{12}$ hydrocarbyl, $C_1$-$C_{12}$ hydrocarbyloxy, or halogen, and wherein each occurrence of $R^9$ is independently hydrogen, $C_1$-$C_{12}$ hydrocarbyl or $C_1$-$C_{12}$ halohydrocarbyl. In a very specific embodiment, each occurrence of $R^8$ and $R^9$ is methyl, and Y is methoxy.

In some embodiments, the monohydric phenol comprises 2,6-dimethylphenol, and the hydroxyaryl-terminated polysiloxane has the structure

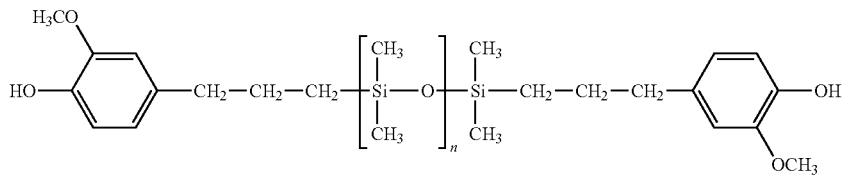

wherein n is, on average, 5 to 100, specifically 30 to 60.

The oxidative copolymerization method produces poly(phenylene ether)-polysiloxane block copolymer as the desired product and poly(phenylene ether) (without an incorporated polysiloxane block) as a by-product. It is not necessary to separate the poly(phenylene ether) from the poly(phenylene ether)-polysiloxane block copolymer. The poly(phenylene ether)-polysiloxane block copolymer can thus be utilized as a "reaction product" that includes both the poly(phenylene ether) and the poly(phenylene ether)-polysiloxane block copolymer. Certain isolation procedures, such as precipitation from isopropanol, make it possible to assure that the reaction product is essentially free of residual hydroxyaryl-terminated polysiloxane starting material. In other words, these isolation procedures assure that the polysiloxane content of the reaction product is essentially all in the form of poly(phenylene ether)-polysiloxane block copolymer. Detailed methods for forming poly(phenylene ether)-polysiloxane block copolymers are described in U.S. Pat. No. 8,017,697 to Carrillo et al., and U.S. Patent Application Publication No. US 2012/0329961 A1 of Carrillo et al.

In some embodiments, the poly(phenylene ether) has an intrinsic viscosity of 0.25 to 1 deciliter per gram measured by Ubbelohde viscometer at 25° C. in chloroform. Within this range, the poly(phenylene ether) intrinsic viscosity can be 0.3 to 0.6 deciliter per gram.

In some embodiments, the particulate poly(phenylene ether) comprises a poly(2,6-dimethyl-1,4-phenylene ether). In some embodiments, the particulate poly(phenylene ether) has, on average, 0.7 to 1.1 hydroxyl groups per molecule.

In some embodiments, the particles of the particulate poly(phenylene ether) have a mean aspect ratio of 1:1 to 2:1. Equipment to determine particle size and shape characteristics is commercially available as, for example, the CAMSIZER™ and CAMSIZER™ XT Dynamic Image Analysis Systems from Retsch Technology, and the QICPIC™ Particle Size and Shape Analyzer from Sympatec.

Particulate poly(phenylene ether) can be prepared from commercially available poly(phenylene ether) powder using methods including jet milling, ball milling, pulverizing, air milling, or grinding. "Classification" is defined as the sorting of a distribution of particles to achieve a desired degree of particle size uniformity. A classifier is often used together with milling for the continuous extraction of fine particles from the material being milled. The classifier can be, for example, a screen of certain mesh size on the walls of the grinding chamber. Once the milled particles reach sizes small enough to pass through the screen, they are removed. Larger particles retained by the screen remain in the milling chamber for additional milling and size reduction.

Air classification is another method of removing the finer particles from milling. Air classifiers include static classifiers (cyclones), dynamic classifiers (single-stage, multi-stage), cross-flow classifiers, and counter-flow classifiers (elutriators). In general, a flow of air is used to convey the particles from the mill to the classifier, where the fine particles are further conveyed to a collector. The coarse particles, being too heavy to be carried by the air stream, are returned to the mill for further milling and size reduction. In larger operations, air classification is more efficient, while in smaller operations a screen can be used.

The composition comprises the particulate poly(phenylene ether) in an amount of 5 to 40 weight percent, based on the total weight of the composition. Within this range, the particulate poly(phenylene ether) amount can be 5 to 30 weight percent, specifically 5 to 20 weight percent.

In addition to the ketone, the curable component, and the particulate poly(phenylene ether), the composition can, optionally, include a curing agent for the curable component. A person skilled in the art can determine a suitable curing agent and amount based on the identity and amount of the curable component present in the composition. Suitable curing agents for cyanate ester resins, include, for example, cobalt complexes, copper complexes, manganese complexes, zinc complexes, and aluminum complexes such as aluminum acetylacetonate. Suitable curing agents for triallyl cyanurate and triallyl isocyanurate include, for example, organic peroxides. Suitable curing agents for polybutadienes include, for example, sulfur systems, organic peroxides, urethane crosslinkers, metallic oxides, and acetoxysilane. Curing agents for difunctional epoxy compounds and polyfunctional epoxy compounds can be selected from the group consisting of latent cationic cure catalysts, phenolic hardeners, amine compounds, anhydrides, copper (II) salts of aliphatic carboxylic acids, copper (II) salts of aromatic carboxylic acids, aluminum (III) salts of aliphatic carboxylic acids, aluminum (III) salts of aromatic carboxylic acids, copper (II) β-diketonates, aluminum (III) β-diketonates, borontrifluoride-trialkylamine complexes, and combinations thereof. Suitable curing agents for unsaturated esterimide resins include, for example, organic peroxides. Curing agents for curable silicone resins can be selected from the group consisting of tin complexes, and platinum complexes.

The composition can, optionally, further include one or more additives selected from the group consisting of dyes, pigments, colorants, antioxidants, heat stabilizers, light stabilizers, plasticizers, lubricants, flow modifiers, drip retardants, flame retardants, antiblocking agents, antistatic agents, flow-promoting agents, processing aids, substrate adhesion agents, toughening agents, low-profile additives, stress-relief additives, air release additives, wetting and dispersing agents, surface and leveling agents, and combinations thereof. Air release additives promote the release of entrapped air prior to the processing of the thermoset system. They promote air bubble coalescence. In general, air release additives fall into two categories—silicone based and non-silicone based. Dispersing agents act to move and separate agglomerated particles to smaller particles. Wetting and dispersing additives can be used in filled resin systems in order to wet out the particle surfaces, accelerate dispersion, reduce viscosity and dispersion time, increase dispersion quality, lower viscosity, allow higher filler loading, increase the filler load without influencing the viscosity, prevent re-agglomeration, and prevent sedimentation. All these effects will lead to increased homogeneity of the finished part. A preferred class of wetting and dispersing agents is nonionic fluorosurfactants. Nonionic fluorosurfactants are commercially available as, for example, NOVEC nonionic polymeric fluorosurfactants from 3M, ZONYL nonionic fluorosurfactants from DuPont, and CAPSTONE short-chain nonionic fluorosurfactants from DuPont. Surface and leveling agents can reduce surface tension at the resin-substrate interface and improve wetting and flow characteristics, prevent fisheyes, craters, surface defects, and improve leveling. Surface and leveling agents are sometimes used in combination with air release additives. Nonionic fluorosurfactants, such as NOVEC nonionic polymeric fluorosurfactants from 3M, are excellent wetting, levelling and flow control agents for a variety of waterborne, solvent-borne, high-solids, and radiation curable organic polymer coating systems.

When present, additives are generally used in an amount of 0.1 to 5 weight percent, based on the total weight of the composition. Within this range, the total amount of additives can be 0.5 to 3 weight percent, specifically 0.5 to 2 weight percent.

The composition has a low viscosity that facilitates wetting of reinforcing structures. This low viscosity can be objectively manifested as a viscosity of 10 to 250 centipoise measured at a temperature in the range 25 to 30° C. Within the range of 10 to 250 centipoise, the viscosity can be 10 to 50 centipoise, specifically 10 to 25 centipoise.

In a very specific embodiment of the composition, the ketone comprises methyl ethyl ketone; the curable component comprises a difunctional epoxy compound, a polyfunctional epoxy compound, or a combination thereof; the particulate poly(phenylene ether) has a mean particle size of 4 to 10 microns and a particle size relative standard deviation of 30 to 50 percent; the particulate poly(phenylene ether) comprises a poly(2,6-dimethyl-1,4-phenylene ether) having an intrinsic viscosity of 0.3 to 0.6 deciliter per gram, measured at 25° C. in chloroform; and the composition comprises 40 to 60 weight percent of the ketone, 25 to 50 weight percent of the curable component, and 1 to 30 weight percent of the particulate poly(phenylene ether).

One embodiment is a method of forming a composite, comprising: at least partially coating a reinforcing structure with a curable composition, wherein the curable composition comprises, based on the total weight of the composition, 30 to 70 weight percent of a ketone selected from the group consisting of acetone, methyl ethyl ketone, and combinations thereof; 15 to 60 weight percent of a curable component; 5 to 40 weight percent of particulate poly(phenylene ether) having a mean particle size of 3 to 12 microns and a particle size relative standard deviation of 20 to 60 percent; and an effective amount of a curing agent for the curable component to form a curable composition-coated reinforcing structure; and removing at least a portion of the ketone from the curable composition-coated reinforcing structure to form the composite.

The reinforcing structure can comprise a reinforcing fabric comprising fibers selected from the group consisting of glass fibers, carbon fibers, aromatic polyamide fibers, and combinations thereof. In some embodiments, the reinforcing structure comprises glass cloth. Additional reinforcing structures include co-woven structures comprising at least two types of fibers, including glass fiber-carbon fiber, carbon fiber-aromatic polyimide (aramid) fiber, and aromatic polyimide fiber-glass fiber. Reinforcing structures further include non-woven fibrous reinforcements such as continuous strand mat, chopped strand mat, tissues, papers, felts, three-dimensional woven reinforcements, preforms, and braids.

In some embodiments of the method, the particulate poly(phenylene ether) comprises a poly(2,6-dimethyl-1,4-phenylene ether) having an intrinsic viscosity of 0.3 to 0.6 deciliter per gram, measured at 25° C. in chloroform.

The method of forming a composite can, optionally, further comprise at least partially curing the composite to form a prepreg. Conditions for at least partially curing the curable composition can be determined by the skilled person by accounting for factors including the identity and amount of the curable component, and the identity and amount of the curing agent. For example, when the curable component is a bisphenol A diglycidyl ether present in the curable composition at 50 weight percent, and the curing agent is 2-ethyl-4-methyl imidazole present at 1 part by weight per 100 parts by weight of the curable component, partial curing can be effected by exposing the curable composition to 3 to 5 minutes at 140° C.

All of the variations described above in the context of the composition apply as well to the method of forming a composite.

In a very specific embodiment of the method, the reinforcing structure comprises glass cloth; the ketone comprises methyl ethyl ketone; the curable component comprises a difunctional epoxy compound, a polyfunctional epoxy compound, or a combination thereof; the particulate poly(phenylene ether) has a mean particle size of 4 to 10 microns and a particle size relative standard deviation of 30 to 50 percent; the particulate poly(phenylene ether) comprises a poly(2,6-dimethyl-1,4-phenylene ether) having an intrinsic viscosity of 0.3 to 0.6 deciliter per gram, measured at 25° C. in chloroform; and the composition comprises 40 to 60 weight percent of the ketone, 25 to 50 weight percent of the curable component, and 1 to 30 weight percent of the particulate poly(phenylene ether).

Another embodiment is a composite comprising: a reinforcing structure; and an at least partially cured resin at least partially coating the reinforcing structure; wherein the at least partially cured resin comprises, based on the total weight of the at least partially cured resin, 10 to 60 weight percent of a particulate poly(phenylene ether) having a mean particle size of 3 to 12 microns and a particle size relative standard deviation of 20 to 60 percent, and 40 to 90 weight percent of a product of at least partially curing a curable component selected from the group consisting of cyanate ester resins, triallyl cyanurate, triallyl isocyanurate, polybutadienes, difunctional epoxy compounds, polyfunctional epoxy compounds, unsaturated esterimide resins, curable silicone resins, and combinations thereof, and an effective amount of a curing agent for the curable component.

In some embodiments, the composite comprises, based on the total weight of the composite, 40 to 70 weight percent of the reinforcing structure and 30 to 60 weight percent of the at least partially cured resin.

All of the variations described above in the context of the composition apply as well to the composite.

In a very specific embodiment of the composite, the reinforcing structure comprises glass cloth; the particulate poly(phenylene ether) comprises a poly(2,6-dimethyl-1,4-phenylene ether) having an intrinsic viscosity of 0.3 to 0.6 deciliter per gram, measured at 25° C. in chloroform; the at least partially cured resin comprises the product of at least partially curing a difunctional epoxy compound, a polyfunctional epoxy compound, or a combination thereof; and the composite comprises, based on the total weight of the composite, 40 to 70 weight percent of the reinforcing structure and 30 to 60 weight percent of the at least partially cured resin.

Another embodiment is a laminate comprising the product of laminating a plurality of prepregs, wherein each prepreg comprises a reinforcing structure, and an at least partially cured resin at least partially coating the reinforcing structure; wherein the at least partially cured resin comprises, based on the total weight of the at least partially cured resin, 10 to 60 weight percent of a particulate poly(phenylene ether) having a mean particle size of 3 to 12 micrometers and a particle size relative standard deviation of 20 to 60 percent, and 40 to 90 weight percent of s product of at least partially curing a curable component selected from the group consisting of cyanate ester resins, triallyl cyanurate, triallyl isocyanurate, polybutadienes, difunctional epoxy compounds, polyfunctional epoxy compounds, unsaturated esterimide resins, curable silicone resins, and combinations thereof, and an effective amount of a curing agent for the curable component. In the context of "laminating a plurality of prepregs", the word "plurality" means at least two. The number of prepregs used to form a laminate can be, for example, 3 to 12. It will also be understood that the process of laminating includes further curing the partially cured composition of the prepreg. For example, in laminating can be conducted for 30 minutes to 5 hours, at a temperature of 150 to 200° C., at a pressure of 10 to 100 megapascals.

All of the variations described above in the context of the composition apply as well to the laminate.

In a very specific embodiment of the laminate, the reinforcing structure comprises glass cloth; the particulate poly (phenylene ether) comprises a poly(2,6-dimethyl-1,4-phenylene ether) having an intrinsic viscosity of 0.3 to 0.6 deciliter per gram, measured at 25° C. in chloroform; the at least partially cured resin comprises the product of at least partially curing a difunctional epoxy compound, a polyfunctional epoxy compound, or a combination thereof; and each prepreg independently comprises, based on the total weight of the prepreg, 40 to 70 weight percent of the reinforcing structure and 30 to 60 weight percent of the at least partially cured resin.

The invention includes at least the following embodiments.

Embodiment 1

A composition comprising, based on the total weight of the composition: 30 to 70 weight percent of a ketone selected from the group consisting of acetone, methyl ethyl ketone, methyl isobutyl ketone, and combinations thereof; 15 to 60 weight percent of a curable component; and 5 to 40 weight percent of particulate poly(phenylene ether) having a mean particle size of 3 to 12 micrometers and a particle size relative standard deviation of 20 to 60 percent.

Embodiment 2

The composition of embodiment 1, having a viscosity of 10 to 250 centipoise measured at a temperature in the range 25 to 30° C.

Embodiment 3

The composition of embodiment 1 or 2, wherein the ketone comprises methyl ethyl ketone.

Embodiment 4

The composition of any one of embodiments 1-3, wherein the curable component is selected from the group consisting of cyanate ester resins, triallyl cyanurate, triallyl isocyanurate, polybutadienes, difunctional epoxy compounds, polyfunctional epoxy compounds, unsaturated esterimide resins, curable silicone resins, and combinations thereof.

Embodiment 5

The composition of any one of embodiments 1-3, wherein the curable component is selected from the group consisting of cyanate ester resins, triallyl isocyanurate, polybutadiene, difunctional epoxy compounds, cresol novolac epoxy compounds, and combinations thereof.

Embodiment 6

The composition of any one of embodiments 1-5, wherein the particulate poly(phenylene ether) comprises a poly(2,6-dimethyl-1,4-phenylene ether).

Embodiment 7

The composition of any one of embodiments 1-6, wherein the particulate poly(phenylene ether) has an intrinsic viscosity of 0.3 to 0.6 deciliter per gram, measured at 25° C. in chloroform.

Embodiment 8

The composition of any one of embodiments 1-7, further comprising an effective amount of a curing agent for the curable component.

Embodiment 9

The composition of embodiment 1, wherein the ketone comprises methyl ethyl ketone; wherein the curable component is selected from the group consisting of difunctional epoxy compounds, polyfunctional epoxy compounds, and combinations thereof; wherein the particulate poly(phenylene ether) has a mean particle size of 4 to 10 micrometers and a particle size relative standard deviation of 30 to 50 percent; wherein the particulate poly(phenylene ether) comprises a poly(2,6-dimethyl-1,4-phenylene ether) having an intrinsic viscosity of 0.3 to 0.6 deciliter per gram, measured at 25° C. in chloroform; and wherein the composition comprises 40 to 60 weight percent of the ketone, 25 to 50 weight percent of the curable component, and 1 to 30 weight percent of the particulate poly(phenylene ether).

Embodiment 10

A method of forming a composite, comprising: at least partially coating a reinforcing structure with a curable composition, wherein the curable composition comprises, based on the total weight of the composition, 30 to 70 weight percent of a ketone selected from the group consisting of acetone, methyl ethyl ketone, and combinations thereof; 15 to 60 weight percent of a curable component; 5 to 40 weight percent of particulate poly(phenylene ether) having a mean particle size of 3 to 12 microns and a particle size relative standard deviation of 20 to 60 percent; and an effective amount of a curing agent for the curable component to form a curable composition-coated reinforcing structure; and removing at least a portion of the ketone from the curable composition-coated reinforcing structure to form the composite.

Embodiment 11

The method of embodiment 10, wherein the reinforcing structure comprises a reinforcing fabric comprising fibers selected from the group consisting of glass fibers, carbon fibers, aromatic polyamide fibers, and combinations thereof.

Embodiment 12

The method of embodiment 10, wherein the reinforcing structure comprises glass cloth.

Embodiment 13

The method of any one of embodiments 10-12, wherein the particulate poly(phenylene ether) comprises a poly(2,6-dimethyl-1,4-phenylene ether) having an intrinsic viscosity of 0.3 to 0.6 deciliter per gram, measured at 25° C. in chloroform.

Embodiment 14

The method of any one of embodiments 10-13, further comprising at least partially curing the composite to form a prepreg.

Embodiment 15

The method of embodiment 10, wherein the reinforcing structure comprises glass cloth; wherein the ketone comprises methyl ethyl ketone; wherein the curable component is selected from the group consisting of difunctional epoxy compounds, polyfunctional epoxy compounds, and combinations thereof; wherein the particulate poly(phenylene ether) has a mean particle size of 4 to 10 micrometers and a particle size relative standard deviation of 30 to 50 percent; wherein the particulate poly(phenylene ether) comprises a poly(2,6-dimethyl-1,4-phenylene ether) having an intrinsic viscosity of 0.3 to 0.6 deciliter per gram, measured at 25° C. in chloroform; and wherein the composition comprises 40 to 60 weight percent of the ketone, 25 to 50 weight percent of the curable component, and 1 to 30 weight percent of the particulate poly(phenylene ether).

Embodiment 16

A composite comprising: a reinforcing structure; and an at least partially cured resin at least partially coating the reinforcing structure; wherein the at least partially cured resin comprises, based on the total weight of the at least partially cured resin, 10 to 60 weight percent of a particulate poly(phenylene ether) having a mean particle size of 3 to 12 micrometers and a particle size relative standard deviation of 20 to 60 percent, and 40 to 90 weight percent of a product of at least partially curing a curable component selected from the group consisting of cyanate ester resins, triallyl cyanurate, triallyl isocyanurate, polybutadienes, difunctional epoxy compounds, polyfunctional epoxy compounds, unsaturated esterimide resins, curable silicone resins, and combinations thereof, and an effective amount of a curing agent for the curable component.

Embodiment 17

The composite of embodiment 16, wherein the reinforcing structure comprises glass cloth; wherein the particulate poly(phenylene ether) comprises a poly(2,6-dimethyl-1,4-phenylene ether) having an intrinsic viscosity of 0.3 to 0.6 deciliter per gram, measured at 25° C. in chloroform; wherein the at least partially cured resin comprises the product of at least partially curing a curable component selected from the group consisting of difunctional epoxy compounds, polyfunctional epoxy compounds, and combinations thereof; and wherein the composite comprises, based on the total weight of the composite, 40 to 70 weight percent of the reinforcing structure and 30 to 60 weight percent of the at least partially cured resin.

Embodiment 18

A laminate comprising the product of laminating a plurality of prepregs, wherein each prepreg comprises a reinforcing structure; and an at least partially cured resin at least partially coating the reinforcing structure; wherein the at least partially cured resin comprises, based on the total weight of the at least partially cured resin, 10 to 60 weight percent of a particulate poly(phenylene ether) having a mean particle size of 3 to 12 micrometers and a particle size relative standard deviation of 20 to 60 percent, and 40 to 90 weight percent of a product of at least partially curing a curable component selected from the group consisting of cyanate ester resins, triallyl cyanurate, triallyl isocyanurate, polybutadienes, difunctional epoxy compounds, polyfunctional epoxy compounds, unsaturated esterimide resins, curable silicone resins, and combination thereof, and an effective amount of a curing agent for the curable component.

Embodiment 19

The laminate of embodiment 18, wherein the reinforcing structure comprises glass cloth; wherein the particulate poly(phenylene ether) comprises a poly(2,6-dimethyl-1,4-phenylene ether) having an intrinsic viscosity of 0.3 to 0.6 deciliter per gram, measured at 25° C. in chloroform; wherein the at least partially cured resin comprises the product of at least partially curing a curable component selected from the group consisting of difunctional epoxy compounds, polyfunctional epoxy compounds, and combinations thereof; and wherein each prepreg independently comprises, based on the total weight of the prepreg, 40 to 70 weight percent of the reinforcing structure and 30 to 60 weight percent of the at least partially cured resin.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

EXAMPLES

Components used to prepare compositions are summarized in Table 1.

Particulate poly(phenylene ether) was prepared as follows. Poly(2,6-dimethyl-1,4-phenylene ether) was obtained in powder form as PPO™ 640 Resin from Sabic Innovative Plastics. As obtained, the powder had a mean particle size of about 200 micrometers. The powder was jet milled. In this step, compressed nitrogen gas was introduced into nozzles to create a supersonic grinding stream. The powder starting material was injected into this violent, turbulent, rotating stream. Rotation generated high speed particle collisions create increasingly smaller particles via particle-on particle impact collisions. Large particles were held in the grinding area by centrifugal force while centripetal force was used to drive finer particles towards the center of the discharge. A sieve of a desired upper size limit was then used to recover particles with precise size lower than the sieve nominal opening. Larger particles were recycled to the reduction size chamber for further grinding.

TABLE 1

| Component | Description |
|---|---|
| MEK | Methyl ethyl ketone, CAS Reg. No. 78-93-3; obtained from Fisher Scientific. |
| Acetone | Acetone, CAS Reg. No. 67-64-1; obtained from Fisher Scientific. |
| Toluene | Toluene, CAS Reg. No. 108-88-3; obtained from Fisher Scientific. |
| BPA-CE | Bisphenol A cyanate ester, CAS Reg. No. 1156-51-0; obtained as PRIMASET ® BADCy from Lonza Group Ltd. |
| TAIC | Triallyl isocyanurate, CAS Reg. No. 1025-15-6; obtained from Sigma Aldrich. |
| CNE | Epoxy o-cresylic novolac resin having an average functionality of 4.1, CAS Reg. No. 29690-82-2; obtained as EPON™ Resin 164 from Momentive. |
| BPA Epoxy | Bisphenol A diglycidyl ether, CAS Reg. No. 1675-54-3, having an epoxy equivalent weight of 185-192 daltons; obtained as EPON™ 828 from Momentive. |
| 2,4-EMI | 2-Ethyl-4-methylimidazole, CAS Reg. No. 931-36-2, obtained from Fisher Scientific. |
| pPPE | Particulate poly(2,6-dimethyl-1,4-phenylene ether), CAS Reg. No. 24938-67-8, having an intrinsic viscosity of 0.4 deciliter per gram, measured in chloroform at 25° C.; prepared as described above to yield a mean particle size of 6 micrometers, and particle size standard deviation of 2.3 micrometers, corresponding to a particle size relative standard deviation of 38%. |
| E-glass cloth | E-glass cloth having a metric count of 87 × 67 per 5 centimeters, yarn 9 68 1 × 0 9 68 1 × 0 warp × fill, thickness of 0.173 millimeters, and a weight of 203.4 gram/meter$^2$; obtained as Fabric Style 7628 from BGF Industries, Inc. |

Varnish Preparation

Varnishes employing acetone or methyl ethyl ketone (MEK) as solvents were prepared with particulate poly (phenylene ether (pPPE) and various types of thermoset resins according to the compositions of Examples 1 to 16, shown in Table 2. Varnishes were prepared by first dissolving the thermoset resin in the solvent. Particulate PPE is not soluble in acetone or MEK, therefore particulate PPE was suspended in the varnish solution. The total resin content of the varnish solutions was held constant at 50 weight percent (wt. %). Once a homogeneous dispersion was obtained, initial viscosity was determined for each of Examples 1 to 16 using a Brookfield Viscometer. Viscosity was determined again for each solution after 2 days. In some cases, viscosity was determined a third time after 7 days.

Varnish compositions and viscosity measurements are summarized in Table 2, where component amounts are expressed in weight percent based on the total weight of the solvent, the thermoset resin, and the particulate PPE. In addition to the components listed, each composition contained 2-ethyl-4-methylimidazole at 1 part by weight per 100 parts by weight of the curable component. Viscosities are reported in centipoise (cP).

As illustrated by Examples 1 to 16, varnish solutions having a pPPE content of 25 weight percent exhibited increased viscosity compared to the same varnish solution having a pPPE content of 7.5 weight percent. The viscosity increase was observed regardless of the type of curable material.

TABLE 2

| | Compositions | | | | | | | |
|---|---|---|---|---|---|---|---|---|
| | E1 | E2 | E3 | E4 | E5 | E6 | E7 | E8 |
| MEK | 50 | 50 | 50 | 50 | 50 | 50 | 50 | 50 |
| Acetone | 0 | 0 | 0 | 0 | 0 | 0 | 0 | 0 |
| CNE | 42.5 | 25 | 0 | 0 | 0 | 0 | 0 | 0 |
| TAIC | 0 | 0 | 42.5 | 25 | 0 | 0 | 0 | 0 |
| BPA-CE | 0 | 0 | 0 | 0 | 42.5 | 25 | 0 | 0 |
| BPA Epoxy | 0 | 0 | 0 | 0 | 0 | 0 | 42.5 | 25 |
| pPPE | 7.5 | 25 | 7.5 | 25 | 7.5 | 25 | 7.5 | 25 |
| Properties | | | | | | | | |
| Initial Viscosity (cP) | 46.3 | 160.4 | 14.8 | 215 | 15.2 | 210 | 14 | 20.4 |
| Temp. (° C.) | 27 | 25.2 | 27 | 25.2 | 27 | 25.2 | 27 | 27 |
| Viscosity, 2 days (cP) | 49.2 | 262 | 14 | 226 | 15.2 | 256 | 15.2 | 76.8 |
| Temp. (° C.) | 24.3 | 25.2 | 24.2 | 25.2 | 24.2 | 25.2 | 24.2 | 24.3 |
| Viscosity, 7 days (cP) | 48 | — | 14 | — | 15 | — | 15 | — |
| Temp. (° C.) | 24.5 | — | 24.5 | — | 24.5 | — | 24.5 | — |

| | Compositions | | | | | | | |
|---|---|---|---|---|---|---|---|---|
| | E9 | E10 | E11 | E12 | E13 | E14 | E15 | E16 |
| MEK | 0 | 0 | 0 | 0 | 0 | 0 | 0 | 0 |
| Acetone | 50 | 50 | 50 | 50 | 50 | 50 | 50 | 50 |
| CNE | 42.5 | 25 | 0 | 0 | 0 | 0 | 0 | 0 |
| TAIC | 0 | 0 | 42.5 | 25 | 0 | 0 | 0 | 0 |
| BPA-CE | 0 | 0 | 0 | 0 | 42.5 | 25 | 0 | 0 |
| BPA Epoxy | 0 | 0 | 0 | 0 | 0 | 0 | 42.5 | 25 |
| pPPE | 7.5 | 25 | 7.5 | 25 | 7.5 | 25 | 7.5 | 25 |
| Properties | | | | | | | | |
| Initial Viscosity (cP) | 53.6 | 98 | 11.2 | 42 | 12 | 86.8 | 17.2 | 81.2 |
| Temp. (° C.) | 25.2 | 25.2 | 27 | 25.2 | 27 | 25.2 | 27 | 27 |
| Viscosity, 2 days (cP) | 90 | 116 | 12 | 63.2 | 15.2 | 63.2 | 17.2 | 76.8 |
| Temp. (° C.) | 26 | 24.9 | 24.1 | 26 | 24.2 | 26 | 24.3 | 24.3 |
| Viscosity, 7 days (cP) | 35.6 | — | 11.6 | — | 12 | — | 17.6 | — |
| Temp. (° C.) | 24.5 | — | 24.4 | — | 24.4 | — | 24.2 | — |

Varnishes employing toluene as the solvent were prepared with particulate poly(phenylene ether) (pPPE) and cresol novolac epoxy (CNE) as the curable component, shown as Comparative Examples 1 to 4 in Table 3. In addition to the components listed, each composition contained 2-ethyl-4-methylimidazole at 1 part by weight per 100 parts by weight of the curable component. Varnishes were prepared using a procedure similar to that used for the above-described varnishes of Examples 1-16. When toluene was used as the solvent, the curable materials dissolved quickly. Particulate PPE was added to the solution, and was also observed to disperse quickly and eventually to dissolve. Viscosities of the varnish solutions were measured immediately, and after 30 minutes. Solution viscosities were determined using a Brookfield Viscometer. The varnish compositions and viscosity measurements of Comparative Examples 1 to 4 are summarized in Table 3. Comparative Examples 1 to 4 demonstrate the varnish solutions including pPPE and using toluene as the solvent have an undesirably high viscosity. For example, a viscosity of 175 cP was obtained for Comparative Example 2, having 7.5 weight percent pPPE, and a viscosity of 865 cP was obtained for Comparative Example 4, having 12.5 weight percent pPPE. Varnishes prepared from toluene and including pPPE were too thick to measure after 2 days.

TABLE 3

|  | CE1 | CE2 | CE3 | CE4 |
|---|---|---|---|---|
| Compositions | | | | |
| Toluene | 54 | 50 | 57 | 50 |
| CNE | 46 | 42.5 | 43 | 37.5 |
| pPPE | 0 | 7.5 | 0 | 12.5 |
| Properties | | | | |
| Initial Viscosity (cP) | 53.2 | 175 | 40 | 865 |
| Temp. (° C.) | 26 | 26 | 23.5 | 23.5 |
| Viscosity, 2 days (cP) | — | ** | — | ** |
| Temp. (° C.) | — | — | — | — |
| Viscosity, 7 days (cP) | — | — | — | — |
| Temp. (° C.) | — | — | — | — |

**denotes the varnish was too thick to measure.

Preparation of Prepregs

Prepregs were prepared by immersing an E-glass cloth in a varnish solution. Varnish compositions are summarized in Table 4. In addition to the components listed, each composition contained 2-ethyl-4-methylimidazole at 1 part by weight per 100 parts by weight of the curable component. The prepregs were heated in an air circulating oven at 140° C. for 3 to 5 minutes to remove the solvent (MEK or MIBK) and partially cure the curable material. In each of Comparative Example 5 and inventive Examples 17 and 18, methyl ethyl ketone was used as the solvent, and BPA Epoxy was used as the curable material. The initial weight of the E-glass cloth was measured, and compared to the weight of the prepreg following treatment with the varnish and solvent evaporation (i.e., B-staged prepreg). Prepreg compositions are summarized in Comparative Example 5 and inventive Examples 17 and 18, shown in Table 4. Each example includes eight prepreg samples prepared from the same varnish and under the same processing conditions. Average weight percent resin and weight percent glass for each example were taken over the eight prepregs. "Weight percent resin" includes the curable material and the pPPE components, and is based on the total weight of the curable material, the pPPE, and the glass. The prepregs were prepared so as to contain comparable amounts of resin and glass. For example, the average resin content of the prepregs prepared from varnishes not having pPPE was 45.06 weight percent (Comparative Example 5), and 44.47-46.28 weight percent for prepregs prepared from varnishes with pPPE (Examples 17 and 18).

TABLE 4

| CE5 Prepreg | Varnish | | | Prepreg | | | | |
|---|---|---|---|---|---|---|---|---|
| | MEK | BPA Epoxy | pPPE | Glass Wt. (g) | Prepreg Wt. (g) | Resin Wt. (g) | Wt. % Resin | Wt. % Glass |
| 1 | 50 | 50 | 0 | 3.9 | 7.0 | 3.1 | 44.29 | 55.71 |
| 2 | 50 | 50 | 0 | 3.9 | 7.0 | 3.1 | 44.29 | 55.71 |
| 3 | 50 | 50 | 0 | 3.9 | 7.2 | 3.3 | 45.83 | 54.17 |
| 4 | 50 | 50 | 0 | 3.9 | 7.2 | 3.3 | 45.83 | 54.17 |
| 5 | 50 | 50 | 0 | 3.9 | 7.0 | 3.1 | 44.29 | 55.71 |
| 6 | 50 | 50 | 0 | 3.9 | 7.2 | 3.3 | 45.83 | 54.17 |
| 7 | 50 | 50 | 0 | 3.9 | 7.0 | 3.1 | 44.29 | 55.71 |
| 8 | 50 | 50 | 0 | 3.9 | 7.2 | 3.3 | 45.83 | 54.17 |
| | | | | | | Average | 45.06 | 54.94 |
| E17 Prepreg | Varnish | | | Prepreg | | | | |
| | MEK | BPA Epoxy | pPPE | Glass Wt. (g) | Prepreg Wt. (g) | Resin Wt. (g) | Wt. % Resin | Wt. % Glass |
| 1 | 50 | 35 | 15 | 3.9 | 7.1 | 3.2 | 45.07 | 54.93 |
| 2 | 50 | 35 | 15 | 3.9 | 6.9 | 3.0 | 43.48 | 56.52 |
| 3 | 50 | 35 | 15 | 3.9 | 7.0 | 3.1 | 44.29 | 55.71 |
| 4 | 50 | 35 | 15 | 3.9 | 7.0 | 3.1 | 44.29 | 55.71 |
| 5 | 50 | 35 | 15 | 3.9 | 7.0 | 3.1 | 44.29 | 55.71 |
| 6 | 50 | 35 | 15 | 3.9 | 6.9 | 3.0 | 43.48 | 56.52 |
| 7 | 50 | 35 | 15 | 3.9 | 7.1 | 3.2 | 45.07 | 54.93 |
| 8 | 50 | 35 | 15 | 3.9 | 7.2 | 3.3 | 45.83 | 54.17 |
| | | | | | | Average | 44.47 | 55.53 |
| E18 Prepreg | Varnish | | | Prepreg | | | | |
| | MEK | BPA Epoxy | pPPE | Glass Wt. (g) | Prepreg Wt. (g) | Resin Wt. (g) | Wt. % Resin | Wt. % Glass |
| 1 | 50 | 25 | 25 | 3.9 | 7.4 | 3.5 | 47.3 | 52.7 |
| 2 | 50 | 25 | 25 | 3.9 | 7.1 | 3.2 | 45.07 | 54.93 |
| 3 | 50 | 25 | 25 | 3.9 | 7.3 | 3.4 | 46.58 | 53.42 |
| 4 | 50 | 25 | 25 | 3.9 | 7.1 | 3.2 | 45.07 | 54.93 |
| 5 | 50 | 25 | 25 | 3.9 | 7.2 | 3.3 | 45.83 | 54.17 |
| 6 | 50 | 25 | 25 | 3.9 | 7.4 | 3.5 | 47.3 | 52.7 |
| 7 | 50 | 25 | 25 | 3.9 | 7.2 | 3.3 | 45.83 | 54.17 |
| 8 | 50 | 25 | 25 | 3.9 | 7.4 | 3.5 | 47.3 | 52.7 |
| | | | | | | Average | 46.28 | 53.72 |

Preparation of Laminates

Laminates were prepared by layering eight of the partially cured (B-staged) prepregs, and curing in a press at 200° C. for 2 hours with a pressure of 31 megapascals (4500 pounds per square-inch). Compositions and properties of laminates are summarized in Table 5. In addition to the components listed, each composition contained 2-ethyl-4-methylimidazole at 1 part by weight per 100 parts by weight of the curable component.

Dielectric constants and dissipation factors of the laminates were measured at 23° C., according to IPC-TM-650-2.5.5.9 using a Hewlett Packard Parallel Plate RF impedance/material analyzer 1 megahertz to 1.8 gigahertz, equipped with a Hewlett Packard Dielectric Material test fixture model 16453A. Test laminates had the dimensions 2.5 by 2.5 centimeters. The laminates were conditioned at 23° C. and 50% relative humidity for at least 24 hours before testing.

Dielectric measurements were conducted using a capacitance method, sweeping a range of frequencies when DC voltage was applied to the dielectric materials. The applied voltage was 0.2 millivolt to 1 volt at the frequency range of 1 megahertz to 1 gigahertz. Values for dielectric constants (Dk, relative permittivity) and loss tangent (Df, dissipation factor) at a frequency of 1 gigahertz were recorded. The results are summarized in Table 5.

As illustrated by Comparative Example 6, laminates prepared from prepregs not having particulate poly(phenylene ether) did not achieve the desired low dielectric constants necessary for high performance electronics. For example, Dk and Df values of 3.847 and 0.01674, respectively, at 1 gigahertz were obtained for Comparative Example 6. The laminates of inventive Examples 19 and 20 demonstrate the inclusion of pPPE allows for laminates having lower dielectric constants (Dk<3.7; Df<0.015). The laminate of inventive Example 20, which incorporates pPPE at 25 weight percent, demonstrated further reduced dielectric constants compared to inventive Example 19, which incorporates pPPE at 15 weight percent. Laminates having lower dielectric constants can provide faster signal propagation, and are ideally suited for use in high speed digital electronic applications.

TABLE 5

|  | CE6 | E19 | E20 |
| --- | --- | --- | --- |
| Compositions | | | |
| Solvent | MEK | MEK | MEK |
| BPA Epoxy | 45.0 | 27.6 | 21.4 |
| pPPE | 0.0 | 15.0 | 25.0 |
| Glass | 55.0 | 57.4 | 53.6 |
| Properties | | | |
| Dk @ 1 GHz | 3.847 | 3.639 | 3.571 |
| Df @ 1 GHz | 0.01674 | 0.01443 | 0.01481 |

The invention claimed is:

1. A composition comprising, based on the total weight of the composition:
   30 to 70 weight percent of a ketone selected from the group consisting of acetone, methyl ethyl ketone, methyl isobutyl ketone, and combinations thereof;
   15 to 60 weight percent of a curable component; and
   5 to 40 weight percent of particulate poly(phenylene ether) having a mean particle size of 3 to 12 micrometers and a particle size relative standard deviation of 20 to 60 percent, wherein the particulate poly(phenylene ether) is undissoved in the ketone.

2. The composition of claim 1, having a viscosity of 10 to 250 centipoise measured at a temperature in the range 25 to 30° C.

3. The composition of claim 1, wherein the ketone comprises methyl ethyl ketone.

4. The composition of claim 1, wherein the curable component is selected from the group consisting of cyanate ester resins, triallyl cyanurate, triallyl isocyanurate, polybutadienes, difunctional epoxy compounds, polyfunctional epoxy compounds, unsaturated esterimide resins, curable silicone resins, and combinations thereof.

5. The composition of claim 1, wherein the curable component is selected from the group consisting of cyanate ester resins, triallyl isocyanurate, polybutadienes, difunctional epoxy compounds, cresol novolac epoxy compounds, and combinations thereof.

6. The composition of claim 1, wherein the particulate poly(phenylene ether) comprises a poly(2,6-dimethyl-1,4-phenylene ether).

7. The composition of claim 1, wherein the particulate poly(phenylene ether) has an intrinsic viscosity of 0.3 to 0.6 deciliter per gram, measured at 25° C. in chloroform.

8. The composition of claim 1, further comprising an effective amount of a curing agent for the curable component.

9. The composition of claim 1,
   wherein the ketone comprises methyl ethyl ketone;
   wherein the curable component is selected from the group consisting of difunctional epoxy compounds, polyfunctional epoxy compounds, and combinations thereof;
   wherein the particulate poly(phenylene ether) has a mean particle size of 4 to 10 micrometers and a particle size relative standard deviation of 30 to 50 percent;
   wherein the particulate poly(phenylene ether) comprises a poly(2,6-dimethyl-1,4-phenylene ether) having an intrinsic viscosity of 0.3 to 0.6 deciliter per gram, measured at 25° C. in chloroform; and
   wherein the composition comprises
      40 to 60 weight percent of the ketone,
      25 to 50 weight percent of the curable component, and
      1 to 30 weight percent of the particulate poly(phenylene ether).

10. A method of forming a composite, comprising:
   at least partially coating a reinforcing structure with a curable composition, wherein the curable composition comprises, based on the total weight of the composition,
      30 to 70 weight percent of a ketone selected from the group consisting of acetone, methyl ethyl ketone, and combinations thereof;
      15 to 60 weight percent of a curable component;
      5 to 40 weight percent of particulate poly(phenylene ether) having a mean particle size of 3 to 12 microns and a particle size relative standard deviation of 20 to 60 percent, wherein the particulate poly(phenylene ether) is undissoved in the ketone; and
      an effective amount of a curing agent for the curable component to form a curable composition-coated reinforcing structure; and
   removing at least a portion of the ketone from the curable composition-coated reinforcing structure to form the composite.

11. The method of claim 10, wherein the reinforcing structure comprises a reinforcing fabric comprising fibers selected from the group consisting of glass fibers, carbon fibers, aromatic polyamide fibers, and combinations thereof.

12. The method of claim 10, wherein the reinforcing structure comprises glass cloth.

13. The method of claim 10, wherein the particulate poly(phenylene ether) comprises a poly(2,6-dimethyl-1,4-phenylene ether) having an intrinsic viscosity of 0.3 to 0.6 deciliter per gram, measured at 25° C. in chloroform.

14. The method of claim 10, further comprising at least partially curing the composite to form a prepreg.

15. The method of claim 10,
wherein the reinforcing structure comprises glass cloth;
wherein the ketone comprises methyl ethyl ketone;
wherein the curable component is selected from the group consisting of difunctional epoxy compounds, polyfunctional epoxy compounds, and combinations thereof;
wherein the particulate poly(phenylene ether) has a mean particle size of 4 to 10 micrometers and a particle size relative standard deviation of 30 to 50 percent;
wherein the particulate poly(phenylene ether) comprises a poly(2,6-dimethyl-1,4-phenylene ether) having an intrinsic viscosity of 0.3 to 0.6 deciliter per gram, measured at 25° C. in chloroform; and
wherein the composition comprises
40 to 60 weight percent of the ketone,
25 to 50 weight percent of the curable component, and
1 to 30 weight percent of the particulate poly(phenylene ether).

* * * * *